US007600905B2

(12) United States Patent
Geiger et al.

(10) Patent No.: US 7,600,905 B2
(45) Date of Patent: Oct. 13, 2009

(54) LIGHT UNIT AND EXTERIOR MIRROR WITH A LIGHT UNIT

(75) Inventors: Uwe Geiger, Böhmenkirchen (DE); André Glaeser, Esslingen (DE)

(73) Assignee: SMR Patents S.a.r.l., Luxembourg (LU)

( * ) Notice: Subject to any disclaimer, the term of this patent is extended or adjusted under 35 U.S.C. 154(b) by 67 days.

(21) Appl. No.: 11/747,308

(22) Filed: May 11, 2007

(65) Prior Publication Data

US 2007/0290829 A1 Dec. 20, 2007

(30) Foreign Application Priority Data

May 11, 2006 (DE) ................ 10 2006 022 990

(51) Int. Cl.
*F21V 8/00* (2006.01)
(52) U.S. Cl. ............... 362/551; 362/494; 362/540; 362/511; 362/555; 362/554; 385/88; 385/89; 385/92; 385/45
(58) Field of Classification Search ......... 362/554–556, 362/511, 26–30, 236, 241, 494, 540; 385/901, 385/146, 88, 89, 92, 93, 94, 45, 43, 42, 32, 385/47
See application file for complete search history.

(56) References Cited

U.S. PATENT DOCUMENTS

| 5,371,659 | A | 12/1994 | Pastrick et al. |
| 5,938,320 | A * | 8/1999 | Crandall ................ 362/494 |
| 6,443,582 | B1 | 9/2002 | Tarne et al. |
| 6,637,917 | B2 | 10/2003 | Schwanz et al. |
| 7,128,431 | B2 | 10/2006 | Ludewig et al. |
| 7,168,830 | B2 | 1/2007 | Pastrick et al. |
| 2004/0086223 | A1 * | 5/2004 | Young et al. ............. 385/31 |
| 2004/0257790 | A1 * | 12/2004 | Tanaka et al. ........... 362/23 |
| 2004/0262053 | A1 * | 12/2004 | Ludewig et al. ......... 180/23 |
| 2006/0092644 | A1 * | 5/2006 | Mok et al. ............... 362/327 |

FOREIGN PATENT DOCUMENTS

| DE | 199 39 087 A1 | 2/2001 |
| DE | 102 34 110 A1 | 2/2004 |
| DE | 103 56 483 A1 | 7/2005 |
| DE | 699 25 655 | 3/2006 |
| EP | 1 653 150 | 5/2006 |

OTHER PUBLICATIONS

U.S. Appl. No. 11/277,415.

* cited by examiner

*Primary Examiner*—Jacob Y Choi
*Assistant Examiner*—Robert May
(74) *Attorney, Agent, or Firm*—Reising Ethington P.C.

(57) ABSTRACT

The invention relates to a vehicle light unit with one or several lamps, in which light can be guided in a light conductor material, in particular a flashing direction indicator light unit. At least two light conductor sections (16a-16c) are brought together with a first end (18a-18c) and a second end (20a-20c) respectively at one of their ends (20a-20c) in a junction (30), which forms a decoupling region (24), into which light exits, which is guided in the light conductor sections (16a-16c) to the junction (30). Furthermore, the invention relates to an exterior mirror of a vehicle, which is equipped with a light unit.

17 Claims, 10 Drawing Sheets

LIGHT UNIT AND EXTERIOR MIRROR WITH A LIGHT UNIT

BACKGROUND OF THE INVENTION

The invention relates to a light unit and an exterior mirror with a light unit as filed in the German priority application DE 102006022990.8 which is incorporated by reference.

Especially the invention relates to a light unit and an exterior mirror with a light unit with one or several lamps in which light can be guided in a light conductor material and in particular a flashing direction indicator light unit.

Exterior mirrors, in which a light function is integrated in the form of a flashing direction indicator signal, are well-known. For this purpose, a direction indicator module is integrated as a light unit in a forward-pointing back panel of the mirror housing. At certain areas of such a light unit there are often legal standards to be complied with in respect of the brightness of the light unit.

At the same time, light units are an important design element, which give a vehicle a "look", with which an automotive manufacturer would like to make its product or its product family recognizable to the customer.

SHORT DESCRIPTION OF THE INVENTION

The aim of the invention is to specify a vehicle light unit with which the required functional and legislative characteristics can be ensured with a large degree of design freedom.

Furthermore, an exterior mirror with such a light unit is to be created.

The aim is achieved according to the invention by the feature that at least two light conductor sections with a first end and a second end respectively, are brought together at one of their ends in a junction, which forms a decoupling region, into which light exits, which is guided in the light conductor sections to the junction.

The inventive light unit with one or several lamps, in particular a flashing direction indicator signal unit for an exterior mirror of a vehicle, comprises at least two light conductor sections with a first end and a second end respectively, which are brought together at one of the ends in a junction, which forms a decoupling region, into which light exits, which is guided in the light conductor sections to the junction. Advantageously, the junction can be provided at a position of the light unit, which requires a reliably high emission of light. The light conductor sections can be freely designed and guided partially concealed and/or exposed. An element is to be understood as being a light conductor in which light that is brought in from the lamp is not simply transported through the element in the direct direction of propagation of the light as with a lamp glass lens, but is directed inside the element by total reflection into a decoupling region, which is located away from the coupling region of the light and away from a theoretical exit point, from which the scattered light would theoretically exit in the direct direction of propagation. The light unit is particularly suitable as a lamp for light-emitting diodes (LED). Incandescent lamps or other suitable lamps can, however, also be provided. The light conductor sections can preferably be arranged in a housing that can also be vapor-plated for better coupling of the light. Furthermore, it is advantageous particularly when using LEDs that expensive LED heat sinks and complex electronics and/or control of the LEDs can be dispensed with. The LEDs can be favorably arranged on a common circuit board, which can be designed according to the type of coupling, available installation space and suchlike.

Preferably, at least one of the light conductor sections therefore has a coupling point for a lamp away from the junction. The lamp can be arranged protected from external influences and does not spoil the appearance of the light unit.

The coupling point is preferably arranged at the end, which is away from the junction. The light, or at least a significant proportion of it, is then transported inside the light conductor section from the first end to the second end, which preferably forms the junction. At least one coupling point can, however, also be provided for a lamp perpendicular to a longitudinal extension between the first and second end of the light conductor section.

The light conductor section can have at least one additional decoupling region between the coupling point and the junction. Several decoupling regions can preferably follow one another at such gaps between the coupling point and the junction that an essentially more homogeneous impression of brightness is produced between the coupling point and the junction. The gaps between decoupling regions can follow one another for example at a distance of millimeters, preferably at a distance of around 1 mm. The decoupling regions are located preferably on a top side of the light unit if an emission of light from the top side is desired. If necessary, the decoupling regions can, however, be freely provided on the external surface of the light conductor sections. Typically, decoupling regions can be formed in the case of light conductors by means of an appropriate modification of the surface of the light conductor, on which the light guided inside the light conductor is totally reflected, so that at least some of the light leaves the light conductor at this point and only a part is reflected back into the light conductor. The expert is generally conversant with such modifications from the area of light conductor technology.

Advantageously, the light unit is designed in such a way that the brightness at the junction is at least the same as at individual decoupling regions at the light conductor section, preferably it is greater at the junction than at the other decoupling regions along the light conductor section.

An advantageous design results when two light conductor sections are located in one level and a third light conductor section runs below the level and is connected in the junction to the other light conductor sections. In an installed state, the third light conductor section can be concealed, for example by means of a decorative cover element, and a surprising effect achieved by a high intensity during the emission of light at the junction.

The lamp can shine in its light-exit direction along its optic axis directly into a frontal area of the light conductor section at the coupling point. This embodiment is particularly simple and suitable if loss of intensity due to scattering during coupling of the light does not present a problem. In addition or as an alternative, it can be specified that the lamp or a different lamp at the coupling point projects into a frontal area of the light conductor section.

The lamp can also shine its light at the coupling point via a reflector into a frontal area of the light conductor section.

In addition or as an alternative, the lamp can project at the coupling point into light conductor material, which borders onto the light conductor section.

This embodiment prevents coupling losses particularly effectively. The light conductor material can be arranged, in particular integrally molded, as a coupling optical system at the relevant light conductor section and/or be part of the lamp. This allows LEDs for example to be simply surrounded with a suitable coupling optical system, in particular extruded.

Each suitable type of coupling of the light can therefore be selected to a large extent in line with the needs.

An inventive exterior mirror of a vehicle with a backward-directed opening in an assembled state in a housing with a hollow space in which a mirror can be accommodated, and a forward-directed back panel limiting the hollow space with an external surface with a light unit, has at least two light conductor sections with a first end and a second end respectively, which are brought together at one of the ends in a junction, which forms a decoupling region, into which light exits, which is guided in the light conductor sections to the junction.

Preferably, at least one of the light conductor sections is arranged on the external surface. The other light conductor section can run inside the housing and be guided through the back panel concealed to the junction.

Preferably, two light conductor sections can be located in the external surface and a third light conductor section can run below the external surface and be connected in the junction to the other light conductor sections.

Each or at least one of the light conductor sections can have at least one additional decoupling region between the coupling point and the junction.

Several decoupling regions can follow one another at such gaps between the coupling point and the junction that an essentially more homogeneous impression of brightness is produced between the coupling point and the junction.

The brightness at the junction is at least the same as at decoupling regions at the light conductor section, preferably greater than there.

Preferably, the junction can be arranged at a lateral edge of the housing. If the light unit forms a flashing direction indicator signal, this ensures that the flashing direction indicator signal is recognizable from the side.

Further advantages and details of the invention are explained in more detail in the following on the basis of preferred design examples described in the drawing, without being limited to these design examples.

DETAILED DESCRIPTION OF THE PREFERRED EMBODIMENTS

Functionally consistent elements are always numbered with the same reference marks in the figures. There is a series of structurally similarly designed elements in the figures, for whose description in the case of individual figures reference is made to the relevant preceding figure descriptions to avoid unnecessary repetition.

Each of the FIGS. 1a to 1f illustrates a light unit 10 each with two light Conductor sections 16a, 16b with different coupling of the light from lamps 12a, 12b, which are preferably designed as LEDs. The light units 10 are shown without a housing. such a housing can, however, be provided of course.

Each light conductor section 16a or 16b has a light receiving end 18a or 18b and a nodal end 20a or 20b respectively. At the first and second nodal ends 20a, 20b, the light conductor sections 16a, 16b are brought together in a junction 30, which forms a decoupling region 24, from which light exits, which is guided in the light conductor sections 16a and 16b from lamps 12a, 12b at the first and second light receiving ends 18a, 18b to the junction 30 at the first and second nodal ends 20a, 20b. Each of the light receiving ends 18a, 18b forms in this embodiment a coupling point 22a, 22b respectively for light from the lamps 12a, 12b. A flat circuit board 14 is the carrier for the lamps 12a, 12b.

Figure 1A:
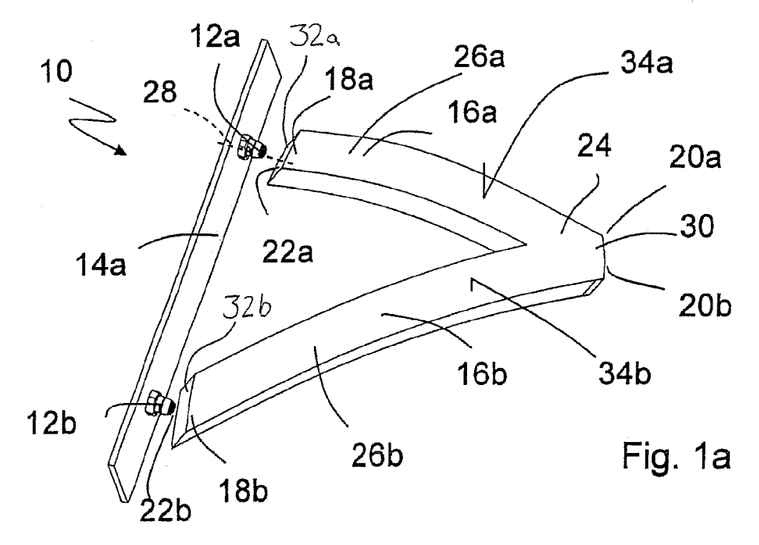
FIG. 1a-f various preferred light units each with two light conductor sections and different coupling of lamps on the face end.
Figure 1B:
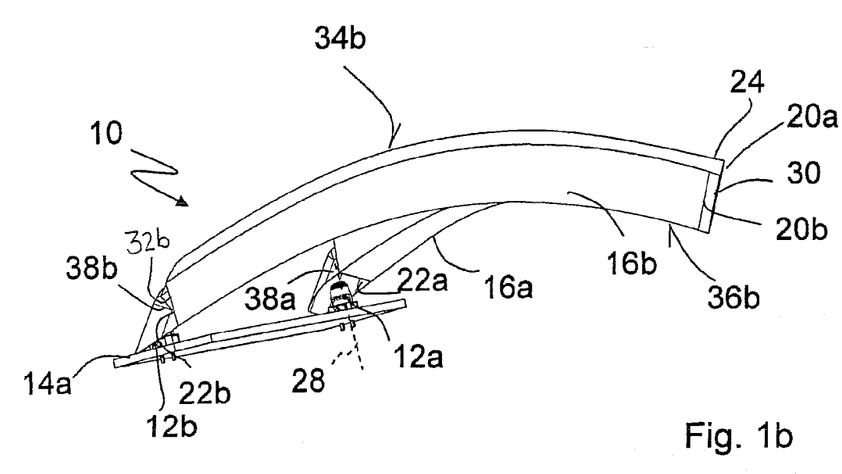
Figure 1C:
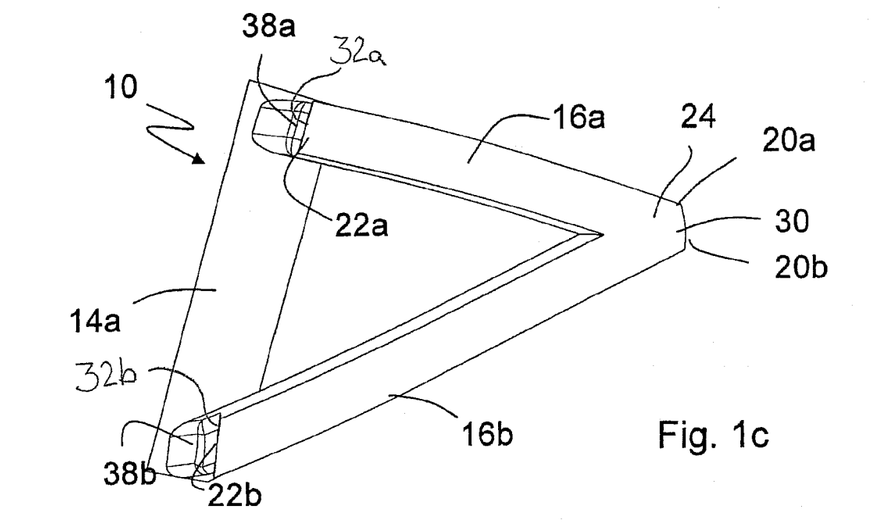
Figure 1D:
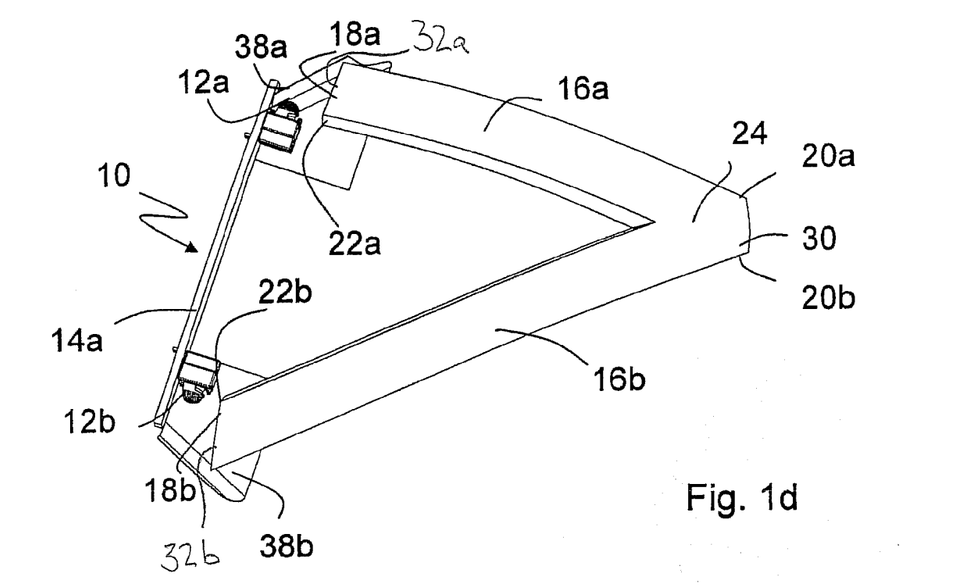
Figure 1E:
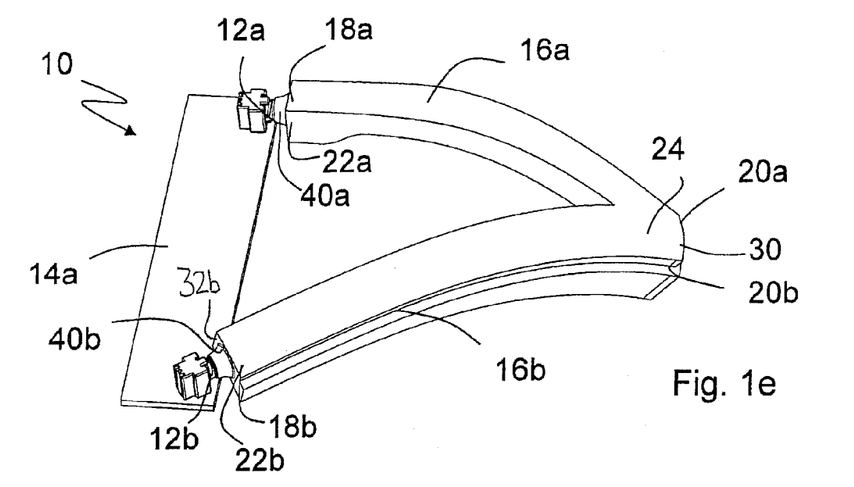
Figure 1F:
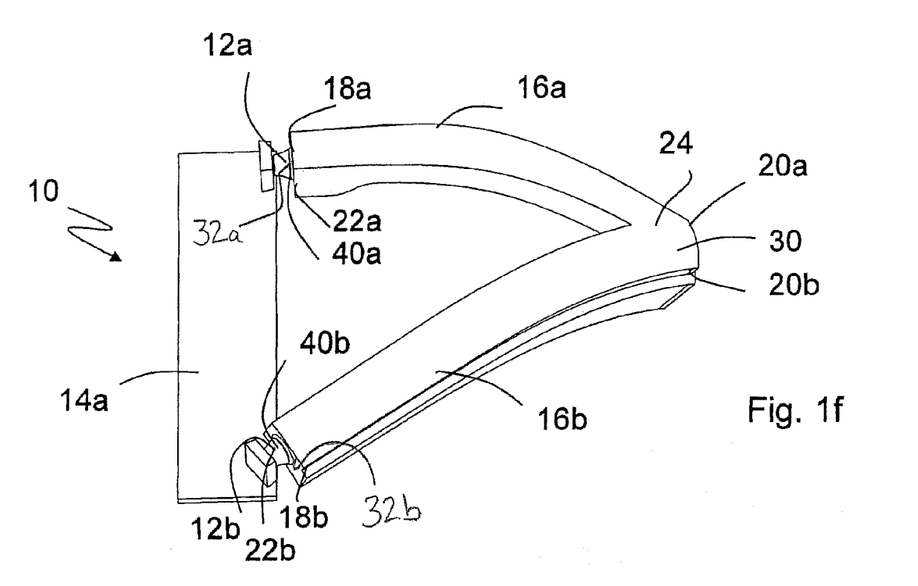

FIG. 1a shows light shining directly into the respective light conductor section 16a, 16b without an additional coupling medium, whereas the FIGS. 1e and 1f show a coupling with a coupling device 40a, 40b. For this purpose, the lamps 12a, 12b project into a light conductor material, which borders onto the frontal areas 32a or 32b of the light conductor sections 16a or 16b. The coupling medium can be integrally molded at the light conductor section 16a, 16b (FIG. 1e) or be arranged at the lamps 12a, 12b (FIG. 1f). The circuit board 14 is arranged approximately parallel (FIGS. 1a, 1d) or perpendicular (FIGS. 1b, 1c, 1e, 1f) to the frontal area 32a, 32b.

FIGS. 1b to 1d show a coupling of light on the face end at each of the light receiving ends 18b, 18b by means of reflectors 38a, 38b. Light from the respective lamps 12a, 12b is directed via the reflectors 38a, 38b into the frontal areas 32a, 32b. The lamps 12a, 12b are either arranged in a horizontal position and shine light away to the side (FIG. 1d), whereby the circuit board 14 is arranged parallel to the frontal areas 32a, 32b, or the lamps 12a, 12b are arranged, as is shown in FIGS. 1b, 1c, vertically on the circuit board 14 oriented perpendicular to the frontal areas 32a, 32b and shine upwards, in the direction of their optic axis 28 into the reflectors 38a, 38b.

The lamps 12a, 12b are preferably designed as LEDs and can be arranged upright, in a horizontal position or tilted on the circuit board 14, in order to be oriented favorably to the frontal areas 32a, 32b of the light conductor sections 16a, 16b depending on the installation wishes.

Apart from at junction 30, light can also be emitted in particular from a top side 34a, 34b of the light conductor sections 16a, 16b. For this purpose, appropriate modifications are provided on the top side 34a, 34b, which are not explained graphically. These can for example be spaced apart so closely, that the top side 34a, 34b shines virtually homogeneous and forms a quasi two-dimensional decoupling region 26a, 26b respectively. Such light units 10 are particularly suitable for a flashing direction indicator signal light unit, which is integrated in an exterior mirror. By combining both light conductor sections 16a, 16b in junction 30, a high degree of luminous efficacy can be ensured there in order, for example, to comply with statutory provisions for such use of the light unit 10.

Figure 2:
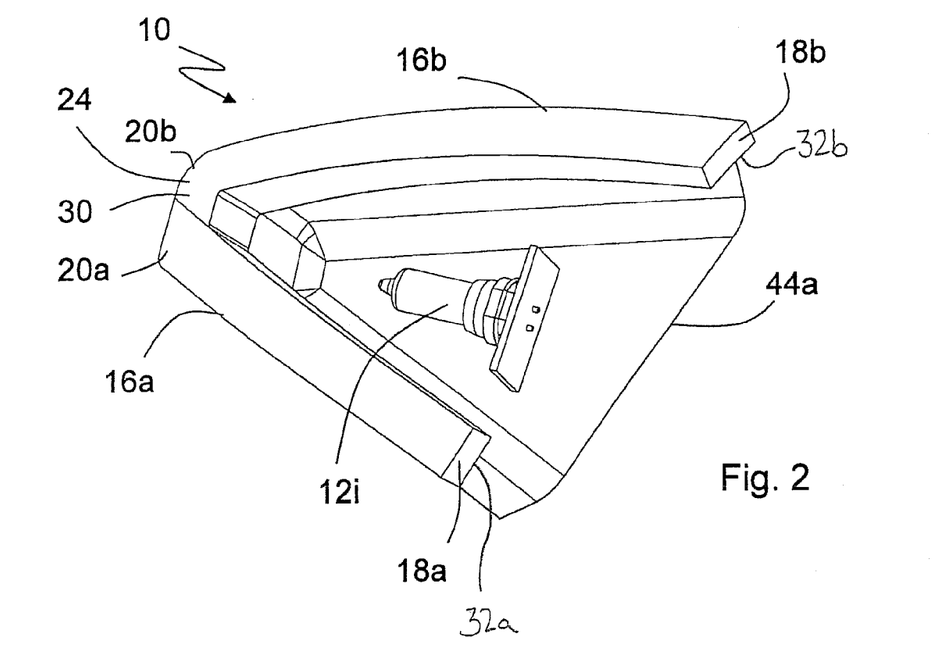
FIG. 2 a preferred light unit with an incandescent lamp in a housing.

FIG. 2 shows a variant of a light unit 10, where an incandescent lamp is provided as lamp 12i, which is arranged in a horizontal position between two light conductor sections 16a, 16b brought together at a junction 30 and is aligned inside a housing 44a in the direction of junction 30. The housing 44a has a V-shaped base matching the light conductor sections

16a, 16b. The light conductor sections 16a, 16b are placed on an edge of the housing 44a, and the housing 44a preferably has a reflective coating on its inner surface to couple as much light as possible from lamp 12i in the light conductor sections 16a, 16b. The light conductor sections 16a, 16b extend from a first 18a or second 18b light receiving end to a first 20a or second 20b nodal end, which form the junction 30, and are designed on the whole V-shaped. Virtually the entire surface of the light conductor sections 16a, 16b illuminated directly from lamp 12i and indirectly from housing 44a forms coupling points for the light. The housing 44a is sealed by a cover which is not shown, whereby the light conductor sections 16a, 16b shine through the cover or are arranged in appropriate recesses of the cover. The V-shaped inner area, in which the lamp 12i is arranged, can be covered by means of an optically opaque element, so that for example only the light conductor sections 16a, 16b are visible.

Figure 3A:
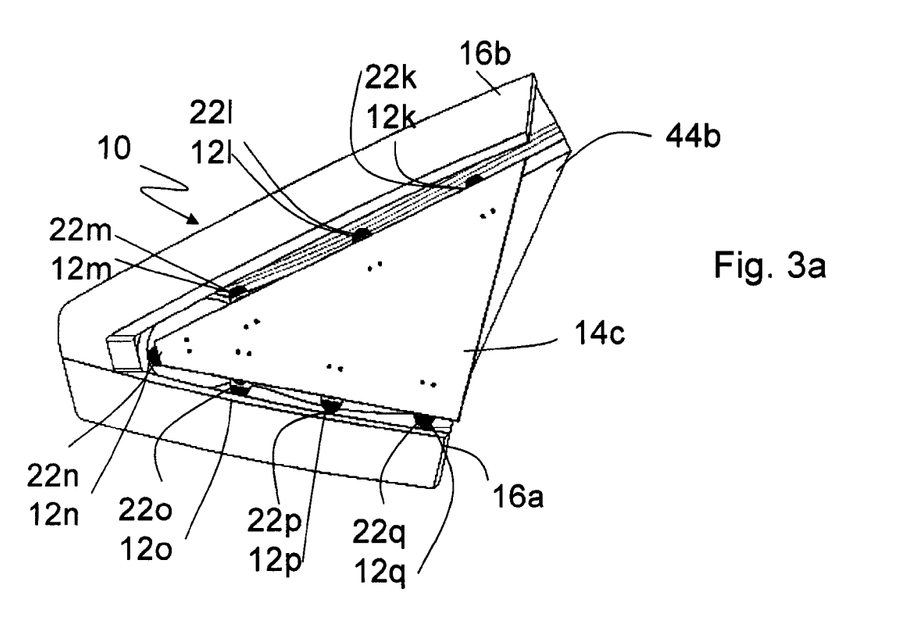
FIGS. 3a, b various views of an additional preferred light unit with lateral coupling to the inner surfaces of light conductor sections.
Figure 3B:
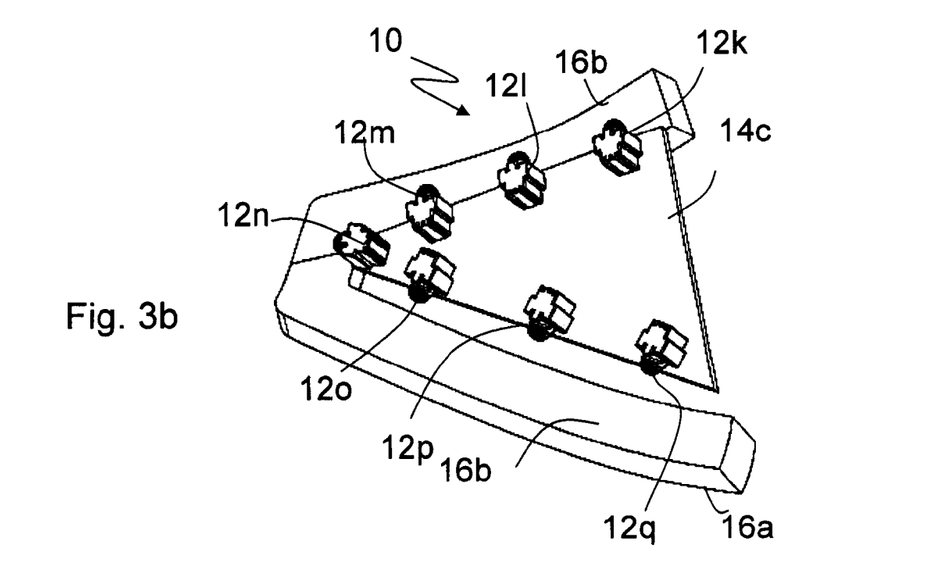

FIGS. 3a and 3b show a further variant of a light unit 10 in various detailed views. The embodiment resembles those in FIG. 2 with a housing 44b, which has a triangular base, and on the raised edge of which light conductor sections 16a and 16b are arranged. The light conductor sections 16a, 16b extend from a light receiving end 18a or 18b to a nodal end 20a or 20b, which form the junction 30, and are designed on the whole V-shaped.

On a triangular circuit board 14c in a recess between the light conductor sections 16a and 16b, lamps 12k-12q are arranged on their edges and directed towards the inner surfaces of the light conductor sections 16a, 16b. The circuit board 14c with the lamps 12k-12q is located below the underside of the light conductor sections 16a, 16b. The view in FIG. 3a shows a top view onto the open housing 44c; the lamps 12k-12q are arranged by way of example on the underside of circuit board 14c turned away from the observer. The housing 44c can have a reflective coating on the inside here as well to prevent loss of intensity due to scattering. FIG. 3b shows a view onto the underside of circuit board 14c with the lamps 12k-12q designed as LEDs located in a horizontal position and emitting light to the side, and the light conductor sections 16a, 16b arranged behind the circuit board 14c in the figure.

The housing 44b is sealed by a cover which is not shown, whereby the light conductor sections 16a, 16b shine through the cover or are arranged in appropriate recesses of the cover.

Figure 4A:
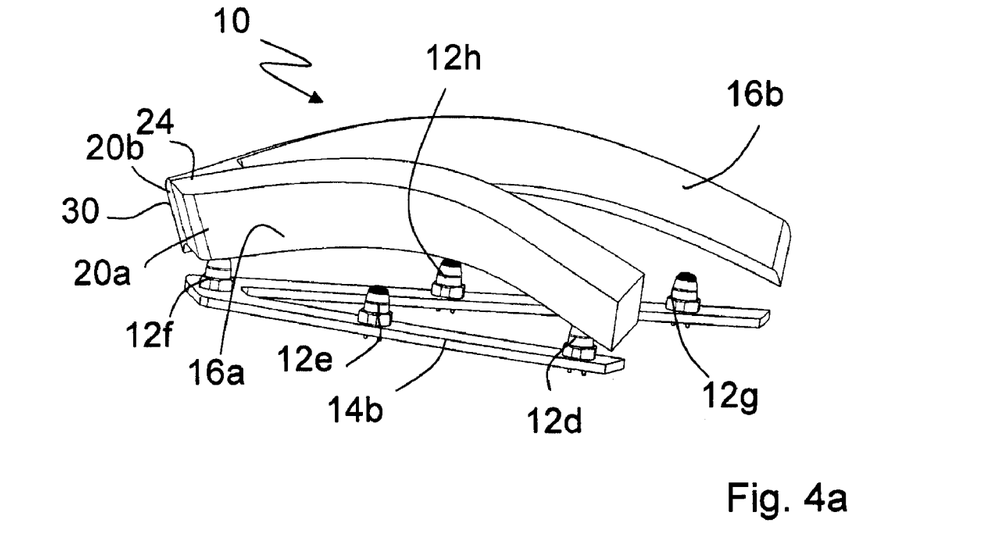
FIG. 4a-c various preferred light units each with two light conductor sections and different coupling on the underside without (a) and with (b) coupling optical system and with housing (c)
Figure 4B:
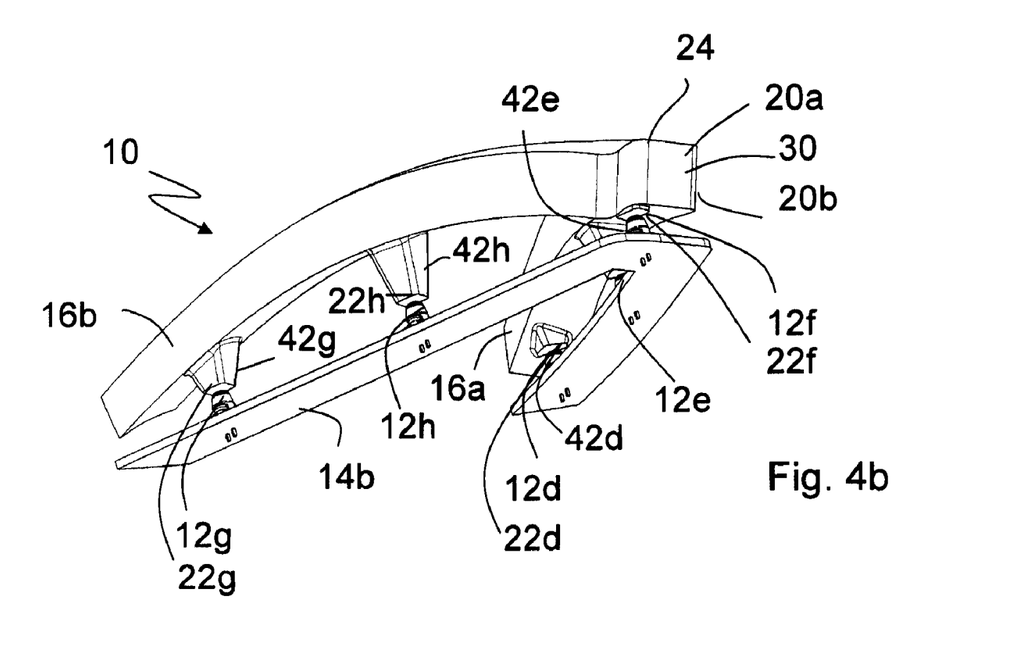
Figure 4C:
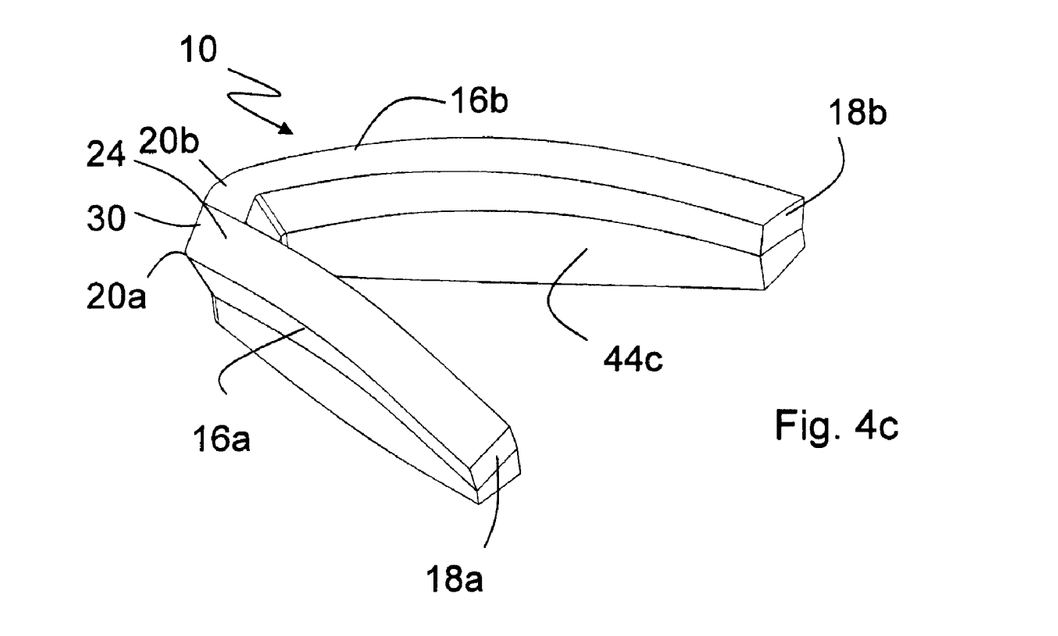

FIGS. 4a to 4c show alternative embodiments of preferred light units 10, in which lamps 12d-12h are provided, which do not have their coupling points 32d-32h on a frontal area 16a, 16b, but on an underside 36a, 36b.

The coupling is effected perpendicular to a longitudinal extension between the light receiving end 18a or 18b and the nodal end 20a or 20c of the light conductor section 16a or 16b. Nevertheless, their light is transported inside the light conductor sections 16a, 16b to the junction 30. In the case of lamp 12f at junction 30, a direct shining through can also be provided, so that the light from lamp 12f can penetrate through the light conductor material directly in the direction of the emission, or at least only a very short route has to be covered inside the light conductor material to junction 30.

The lamps 12d-12h are arranged on a circuit board 14b, which has a V-shape like the light conductor sections 16a, 16b. FIG. 4a shows a coupling without any additional coupling media, FIG. 4b shows a coupling by means of coupling devices 42d-42h, which are arranged in the form of peg-shaped coupling optical systems at coupling points 22d-22h at an underside 36a, 36b of the light conductor sections 16a, 16b. The light conductor sections 16a, 16b are curved upwards slightly, in the form for example of an exterior mirror housing. The coupling devices 42d-42h even out the varying gaps between the undersides 36a, 36b of the light conductor sections 16a, 16b to the flat circuit board 14a and thereby to the lamps 12d-12h.

In FIG. 4c, the circuit board 14b disappears into a likewise V-shaped housing 44c and is concealed by it. The housing 44c can for example have a reflective coating on the inside to reduce light emission losses of the lamps 12d-12h. The light unit 10 has here on the whole an arrow shape.

FIGS. 5a to 5d show a further preferred embodiment of a light unit 10. Here two light conductor sections 16a, 16b are located in a—in this case curved—surface, and a third light conductor section 16c runs outside or below the surface. The surface is modeled for example on a housing of an exterior mirror, in which the light unit 10 can be used, or a contour of a different body part of a vehicle or a different body, in which the light unit 10 is to be used. The light conductor sections 16a, 16b extend from first end 18a second 18b or third 18c light receiving ends to the respective first 20a, second 20b or third 20c, nodal ends, which form the junction 30, and form on the whole a V-shaped base. The cross-section of the third light conductor section 16c can be round (FIGS. 5c, 5d) or angular (FIGS. 5a, 5b), whereas the light conductor sections 16a, 16b preferably have an angular cross-section, which is advantageous for a cover with a lamp glass lens, a decorative optically opaque cover or something like that. The third light conductor section 16c can for example also be designed a great deal shorter than the two light conductor sections 16a, 16b.

In junction 30, all light conductor sections 16a, 16b, 16c are connected with each other and form a decoupling region 24, from which light from lamps 12a, 12b, 12c can be decoupled, the light of which in each case is coupled in a frontal area 32a, 32b or 32c of the respective light conductor section 16a, 16b or 16c. The frontal area 32a, 32b or 32c forms a coupling point 22a, 22b, 22c respectively of the light conductor section 16a, 16b or 16c.

As in the design examples of FIGS. 1a-1f, the lamps 12a-12c preferably designed as LEDs can be arranged on a common, flat circuit board 14a, which is arranged parallel (FIG. 5c), perpendicular (FIG. 5a) or inclined (FIG. 5b) to the frontal area 32a, 32b, 32c. The lamps 12a, 12b, 12c can be arranged upright (FIGS. 5a, 5c), in a horizontal position (FIG. 5b) or also inclined on the circuit board 14a. The lamps 12a, 12b, 12c can project via coupling devices 40a, 40b, 40c into the respective frontal areas 32a, 32b, 32c (FIG. 5c), or shine directly in the direction of their optic axis 28 into the respective frontal areas 32a, 32b, 32c (FIGS. 5a, 5b) without any additional coupling devices.

Figure 5A:
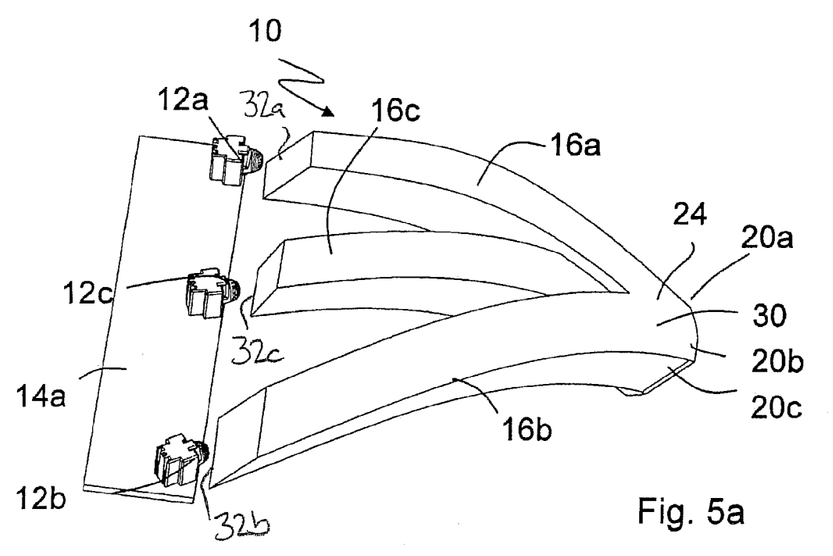
FIG. 5a-d various designs of light units with three light conductor sections and different coupling of lamps (a-c) and with housing (d)
Figure 5B:
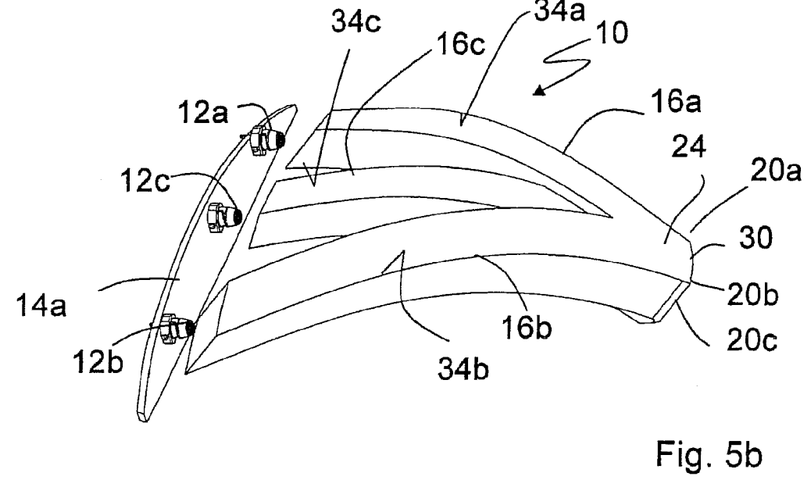
Figure 5C:
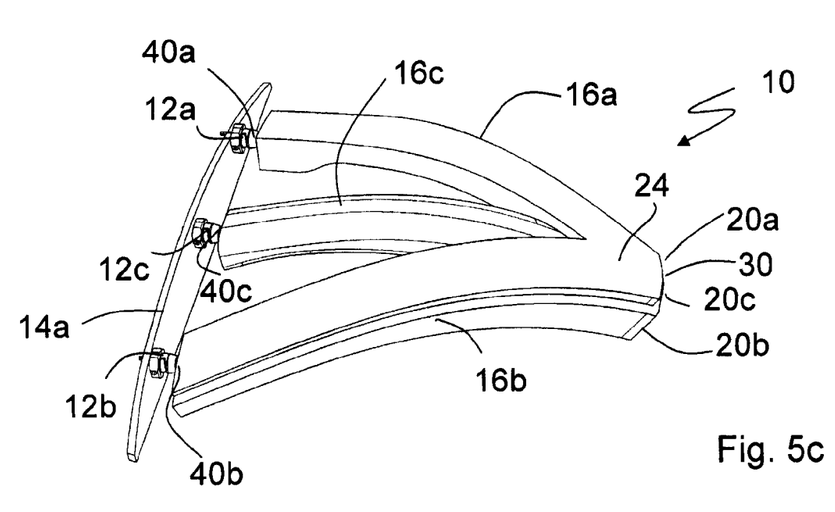
Figure 5D:
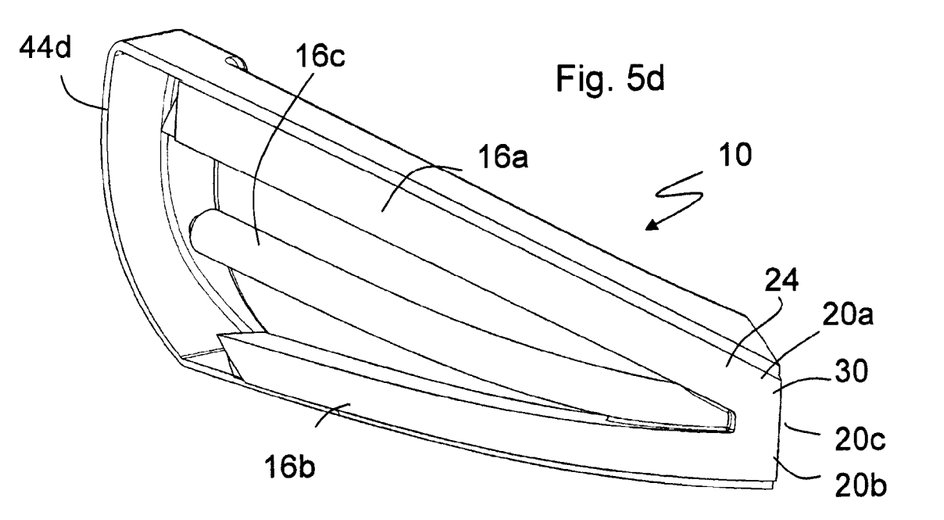

FIG. 5d shows the light unit 10 installed in a housing 44d, which is shown without a cover. For the sake of simplicity, no lamps are shown. The housing 44d can have a reflective coating on the inside here as well. If necessary, a colored finish can be provided, which is favorable for deployment in vehicles. One edge of the housing is raised as far as the light conductor sections 16a, 16b. The housing 44d can for example be used in an exterior mirror, as is shown in FIGS. 6a and 6b.

Figure 6A:
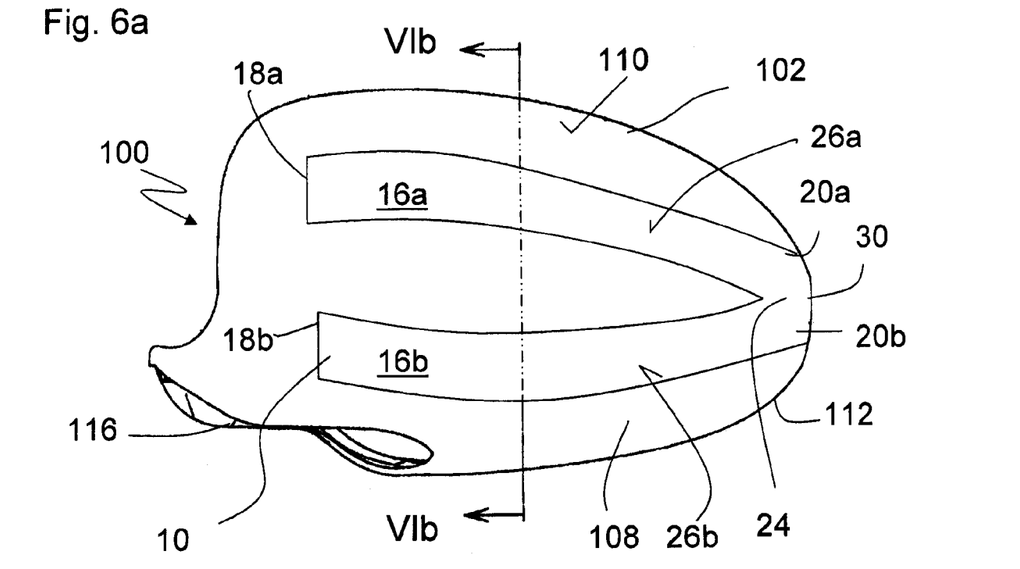
FIGS. 6a, b a preferred exterior mirror with a light unit with three light conductor sections in top view (a) and as a sectional view (b).
Figure 6B:
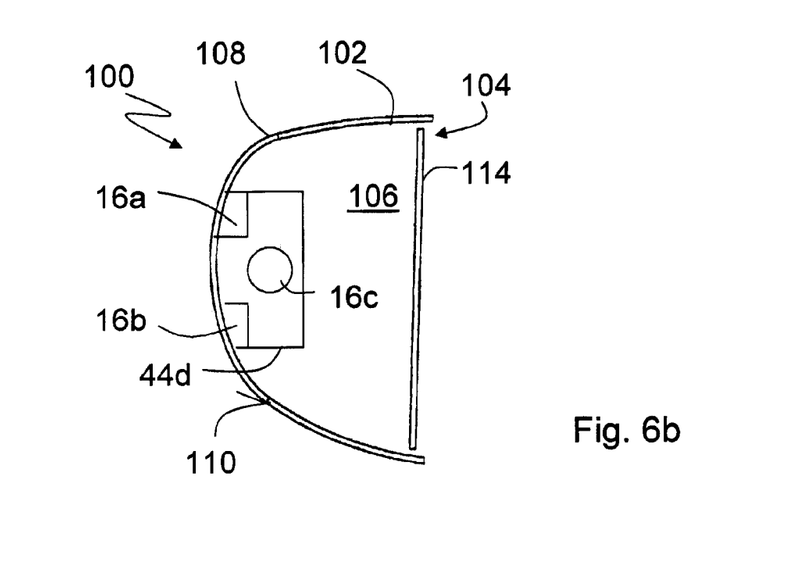

FIGS. 6a and 6b illustrate by way of example a preferred exterior mirror 100 of a vehicle with a backward-directed opening 104 in an assembled state in a housing 102 with a hollow space 106, in which a mirror 114 can be accommodated. A forward-directed back panel 108 limits the hollow space 106. The back panel 108 has an external surface 110 with a light unit 10, which is modeled for example on an embodiment in accordance with FIG. 5 and has three light conductor sections 16a, 16b, 16c in a housing 44d, of which two light conductor sections 16a, 16b run in the external surface 110 or the back panel 108 and the third light conductor section 16c runs below the external surface 110 of the back panel 108 in the hollow space 106.

The light conductor sections 16a, 16b, 16c extend from their respective light receiving ends 18a, 18b, 18c to their nodal ends 20a, 20b, 20c, where they meet in a junction 30 on the lateral edge 112 of the exterior mirror 100, which forms a decoupling region 24, at which light exits from lamps on the frontal areas and/or lamps shining in along the light conductor sections 16a, 16b, 16c. Furthermore, light can also exit on the top side 34a, 34b of the two external light conductor sections 16a, 16b at additional decoupling regions, which are preferably arranged so closely, in particular preferably at a distance of around 1 mm, that the entire external top side 34a, 34b forms a homogeneous as possible decoupling region 26a, 26b.

The brightness at junction 30 is preferably greater than at the other decoupling regions 26a, 26b at the light conductor section 16a, 16b.

LIST OF REFERENCE MARKS

10 Light unit
12a-q Lamp
14a,b,c Circuit board
16a-c Light conductor section
18a-c light receiving ends
20a-c nodal ends
22a-q Coupling point
24 Decoupling region
26a-e Decoupling region
28 Optic axis
30 Junction
32a-c Frontal area
34a-c Top side
36a, b Underside
38a, b Reflector
40a, b Coupling joint
42a-h Coupling joint
44a-d Light conductor housing
100 Exterior mirror
102 Housing
104 Opening
106 Hollow space
108 Back
110 External surface
112 Edge
114 Mirror
116 Fastening

What is claimed:

1. A vehicle light unit (10) comprising:
a first light conductor (16a) extending between a first light receiving end (18a) and a first nodal end (20a);
a second light conductor (16b) extending between a second light receiving end (18b) and a second nodal end (20b), said first nodal end (20a) and said second nodal end (20b) being brought together in a junction (30);
first (12a) and second (12b) lamps disposed adjacent said first (18a) and second (18b) light receiving ends, respectively, to emit light therein;
a third light conductor (16c) connected to said junction (30); and
a decoupling region (26a, 26b) defining a plane and extending along said first (16a) and second (16b) light conductors between said light receiving ends (18a, 18b) and said nodal ends (20a, 20b) allowing light to exit homogenously along said first and second light conductors (16a, 16b) between said light receiving ends (18a, 18b) and said nodal ends (20a, 20b), wherein said third light conductor (16c) extends outside said plane defined by said decoupling region (26a, 26b).

2. The vehicle light unit (10) according to claim 1, characterized in that at least one of said light conductors (16a, 16b) has a coupling point (22a, 22b) for one of said lamps (12, 12b) away from said junction (30).

3. The vehicle light unit (10) according to claim 1, characterized in that at least one of said light conductors (16a, 16b) has a coupling point (22a, 22b) arranged at said light receiving end (18a, 18b) away from said the junction (30).

4. The vehicle light unit (10) according to claim 1, characterized in that said first (20a) and second (20b) nodal ends are disposed adjacent each other such that a coupling of light is provided directly at said junction (30).

5. The vehicle light unit (10) according to claim 1, characterized in that at least one of said light conductors (16a, 16b) has a coupling point (22a, 22b) for said lamp (12a, 12b) perpendicular to a longitudinal extension between said ends (18a, 20a and 18b, 20b).

6. The vehicle light unit (10) according to claim 1, characterized in that said light conductors (16a, 16b) include at least one additional decoupling region therealong.

7. The vehicle light unit according to claim 6, characterized in that said light conductors (16a, 16b) include several decoupling regions follow one another defining a series of gaps between said light receiving ends (18a, 18b) and said nodal ends (20a, 20b) so that a homogeneous impression of brightness is produced therebetween.

8. The vehicle light unit (10) according to claim 1, characterized in that said decoupling regions (26a, 26b) disposed adjacent said junction (30) is at least the same as or greater than at said decoupling regions (26a, 26b) between said nodal ends (20a, 20b) and said light receiving ends (18a, 18b) away from said junction (30).

9. The vehicle light unit according to claim 1, characterized in that said light conductor defines a frontal area at said light receiving ends.

10. The vehicle light unit according to claim 9, including a reflector that directs light emitted by said lamps into said frontal area of said light conductors.

11. An exterior mirror of a vehicle comprising:
a housing defining a backward-directed opening in an assembled state, said housing further defining a hollow space and a front panel (108) limiting the hollow space with an external surface (110);
a mirror operatively secured within said housing;
a first light conductor (16a) extending between a first light receiving end (18a) and a first nodal end (20a);
a second light conductor (16b) extending between a second light receiving end (18b) and a second nodal end (20b), said first nodal end (20a) and said second nodal end (20b) being brought together in a junction (30), said first light conductor (16a) and said second light conductor (16b) extending along said front panel with a portion of said front panel extending between said first (16a) and second (16b) light conductors;
first (12a) and second (12b) lamps disposed adjacent said first (18a) and second (18b) light receiving ends, respectively, to emit light therein; and
a decoupling region (26a, 26b) extending along said first (16a) and second (16b) light conductors between said light receiving ends (18a, 18b) and said nodal ends (20a, 20b) allowing light to exit homogenously along said first and second light conductors (16*a*, 16*b*) between said light receiving ends (18*a*, 18*b*) and said nodal ends (20*a*, 20*b*).

12. An exterior mirror according to claim 11, characterized in that at least one of said light conductors is arranged in said front panel.

13. An exterior mirror according to claim 11, characterized in that at least a portion of one of said light conductors is guided through said front panel concealing said junction.

14. An exterior mirror according to claim 11, including a third light conductor disposed inside said hollow behind said front panel and operatively connected to said first and second light conductors at said junction, wherein said first and second light conductors extend along said front panel.

15. An exterior mirror according to claim 11, characterized in that said light conductors include at least one additional decoupling region disposed between said light receiving ends and said nodal ends.

16. Exterior mirror according to o claim 11, characterized in that said light conductors include several decoupling regions follow one another in series defining gaps between said light receiving ends and said nodal ends creating homogeneous brightness therebetween.

17. Exterior mirror according to claim 11, characterized in that said housing defines a lateral edge whereby said the junction is disposed adjacent said lateral edge.

\* \* \* \* \*